United States Patent [19]
Mammone et al.

[11] Patent Number: 5,839,103
[45] Date of Patent: Nov. 17, 1998

[54] SPEAKER VERIFICATION SYSTEM USING DECISION FUSION LOGIC

[75] Inventors: Richard J. Mammone, Bridge Water, N.J.; Kevin Farrell, Milford, Conn.; Manish Sharma, Piscataway, N.J.; Devang Naik, Sunnyvale, Calif.; Xiaoyu Zhang, Piscataway, N.J.; Khaled Assaleh, Scottsdale, Ariz.; Han-Seng Liou, Waltham, Mass.

[73] Assignee: Rutgers, The State University of New Jersey, Piscataway, N.J.

[21] Appl. No.: 479,012

[22] Filed: Jun. 7, 1995

[51] Int. Cl.[6] ..................................................... G10L 5/00
[52] U.S. Cl. ........................ 704/232; 704/231; 704/234; 704/270
[58] Field of Search ................................ 395/2, 2.1, 2.11, 395/2.12, 2.13, 2.4, 2.41, 2.5, 2.52–2.54, 2.55, 2.6, 2.67, 2.68, 2.79, 2.82; 381/41–43

[56] References Cited

U.S. PATENT DOCUMENTS

| | | | |
|---|---|---|---|
| 4,837,831 | 6/1989 | Gillick et al. | 381/43 |
| 4,975,961 | 12/1990 | Sakoe | 381/43 |
| 5,220,640 | 6/1993 | Frank | 395/2 |
| 5,271,088 | 12/1993 | Bahler | 395/2 |
| 5,404,422 | 4/1995 | Sakamoto et al. | 395/2.41 |
| 5,410,635 | 4/1995 | Sakoe | 395/2.41 |
| 5,430,827 | 7/1995 | Rissanen | 395/2.82 |
| 5,457,770 | 10/1995 | Miyazawa | 395/2.41 |
| 5,522,012 | 5/1996 | Mammone et al. | 395/2.59 |
| 5,528,728 | 6/1996 | Mastsuura et al. | 395/2.41 |

FOREIGN PATENT DOCUMENTS 9505656  8/1992  WIPO .

OTHER PUBLICATIONS

Farrell, Mammone, and Assaleh, "Speaker Recognition Using Neural Networks and Conventional Classifiers," IEEE Trans. on Speech and Audio Processing, v. 2, n. 1, p. 11, pp. 194–205, Jan. 1994.

Deller, Proakis, and Hansen, "Discrete–Time Processing of Speech Signals," 1987, pp. 115–117.

Assaleh and Mammone, "Robust Cepstral Features for Speaker Identification," ICASSP–94, Apr. 19–22, 1994, pp. 129–132.

Farrell, "Text–Dependent Speaker Verification Using Data Fusion," ICASSP–95, May 9–12, 1995, pp. 349–352.

Farrell and Mammone, "Modulation Classification Using a Neural Tree Network," MILCOM–93, Oct. 11–14, 1993, pp. 1028–1032.

Sankar and Mammone, "Growing and Pruning Neural Tree Networks," IEEE Trans. on Computers, 42(3):291–99, Mar. 1993.

Sankar and Mammone, "Speaker Independent Vowel Recognition Using Neural Tree Networks," IJCNN–91, Jul. 8–14, 1991, pp. 809–814.

Farrell and Mammone, "Speaker Identification Using Neural Tree Networks," ICASSP–94, Apr. 19–22, 1994, pp. 165–168.

Sharma and Mammone, "Speech Recognition Using Sub–Word Neural Tree Network Models and Multiple Classifier Fusion," ICASSP–95, May 9–12, 1995, pp. 3323–3326.

(List continued on next page.)

Primary Examiner—David R. Hudspeth
Assistant Examiner—Visay B. Chawan
Attorney, Agent, or Firm—Mathews, Collins, Shepherd & Gould

[57] ABSTRACT

The present invention relates to a pattern recognition system which uses data fusion to combine data from a plurality of extracted features and a plurality of classifiers. Speaker patterns can be accurately verified with the combination of discriminant based and distortion based classifiers. A novel approach using a training set of a "leave one out" data can be used for training the system with a reduced data set. Extracted features can be improved with a pole filtered method for reducing channel effects and an affine transformation for improving the correlation between training and testing data.

24 Claims, 16 Drawing Sheets

OTHER PUBLICATIONS

Liou and Mammone, "A Subword Neural Tree Network Approach to Text–Dependent Speaker Verification," May 9–12, 1995, pp. 357–360.

Assaleh and Mammone, "New LP–Derived Features for Speaker Identification," IEEE Trans. on Speech and Audio Processing, 2(4):630–638, Oct. 1994.

Farrell, Mammone, and Gorin, "Adaptive Language Acquisition Using Incremental Learning," ICASSP–93, Apr. 27–30, 1993, pp. 501–504.

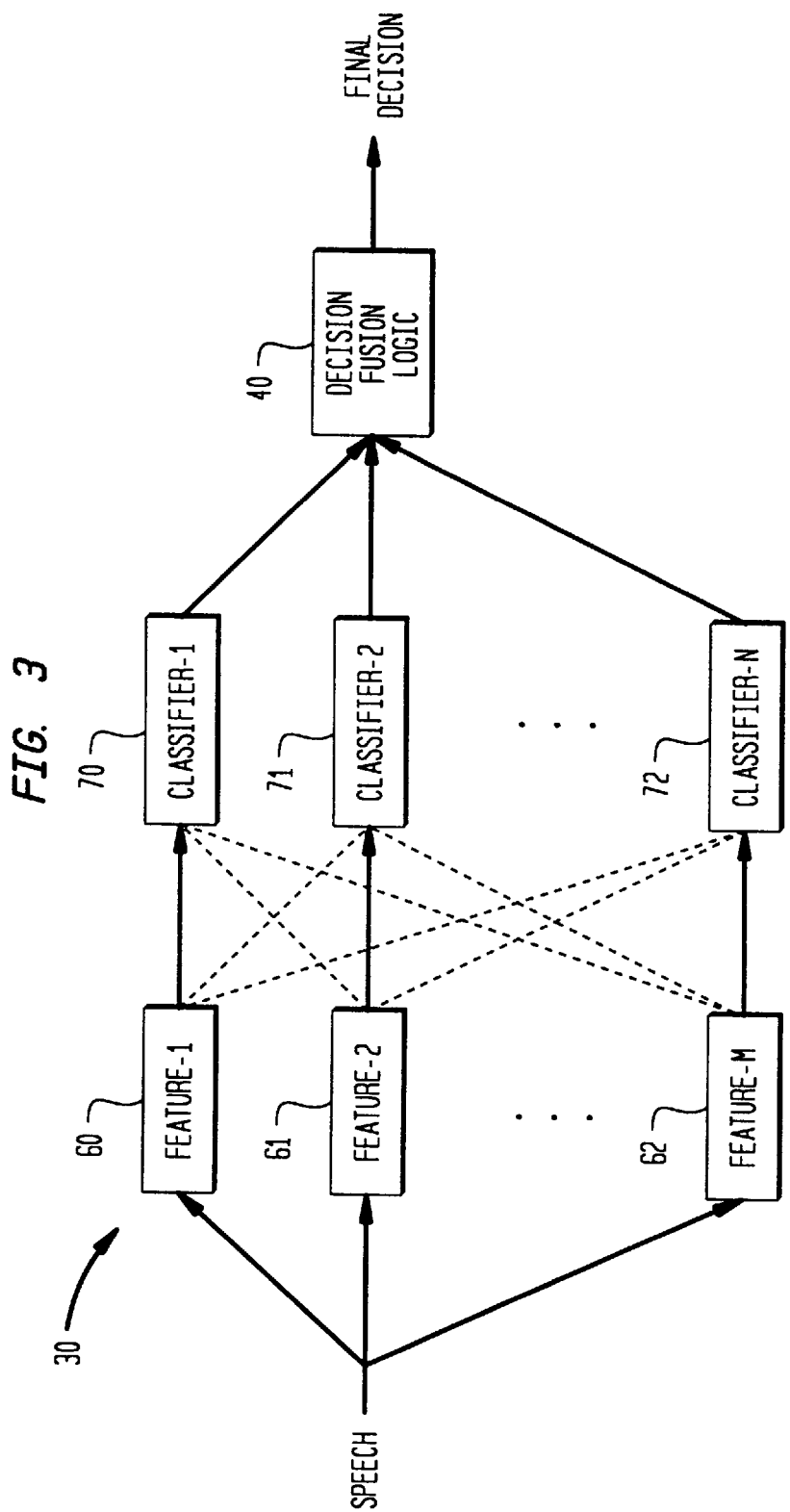

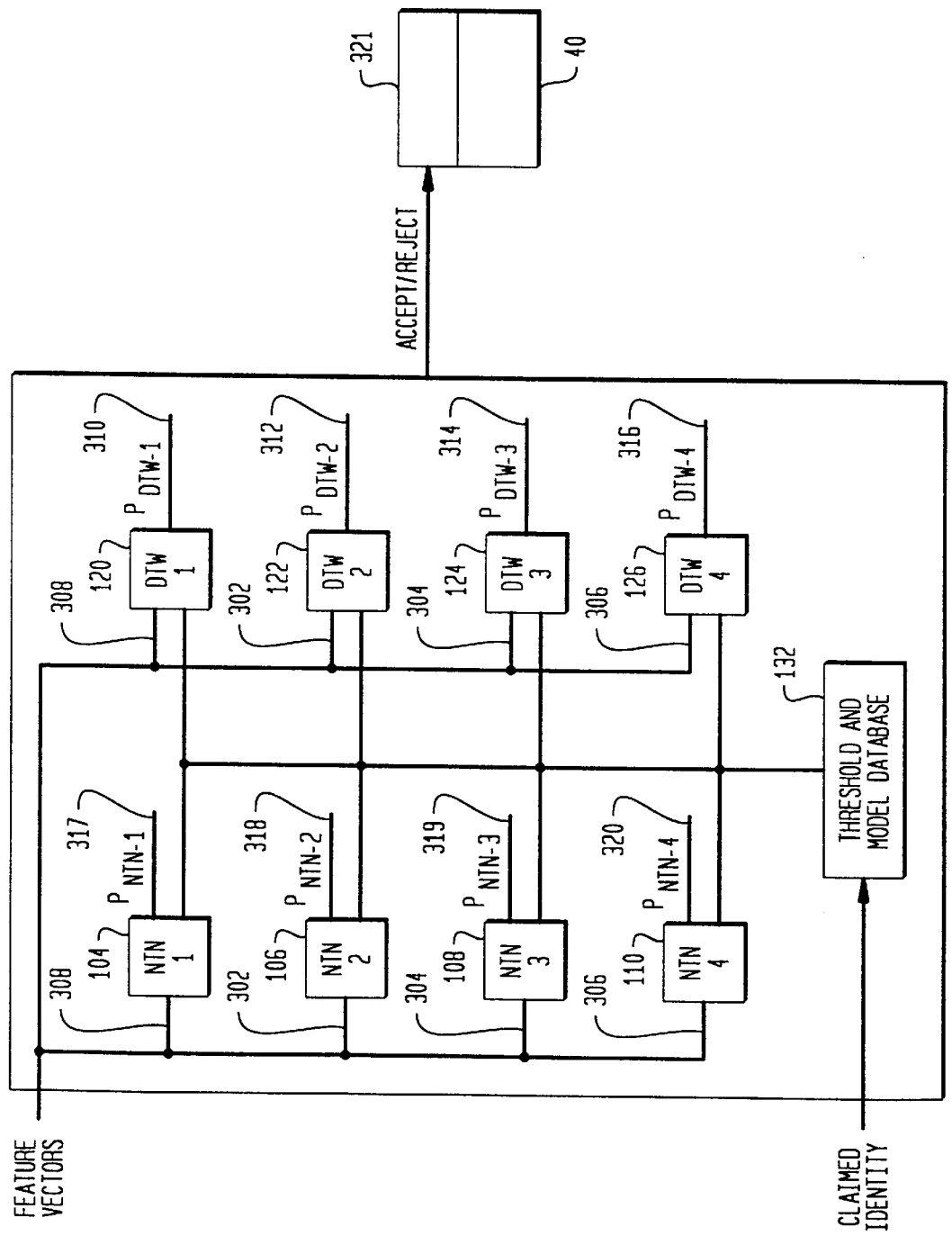

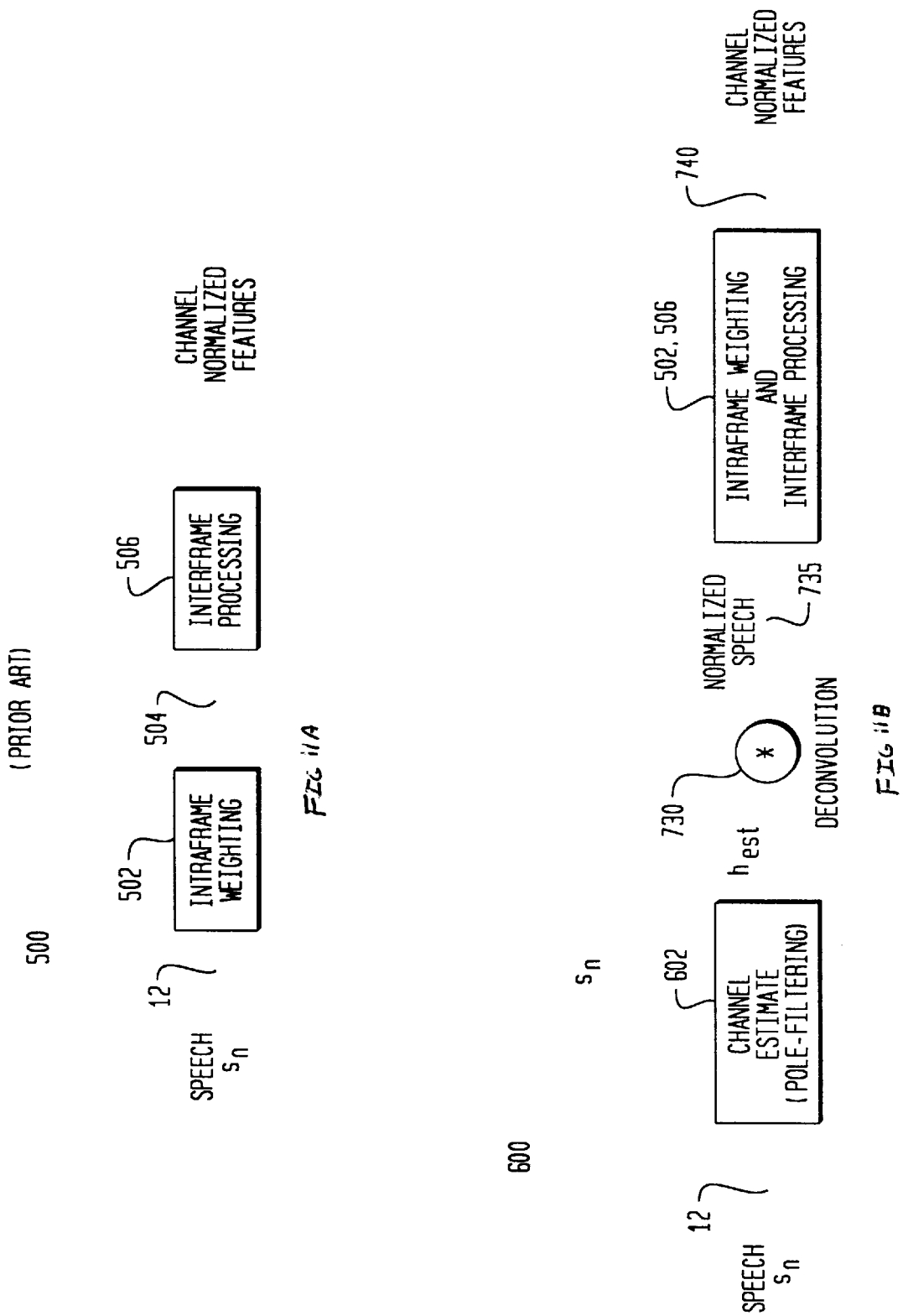

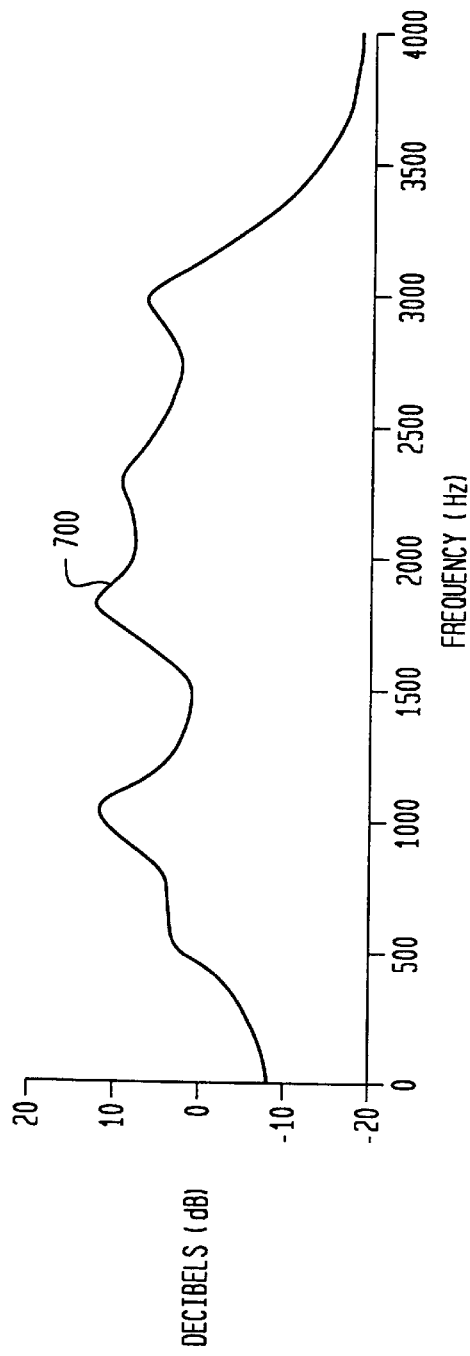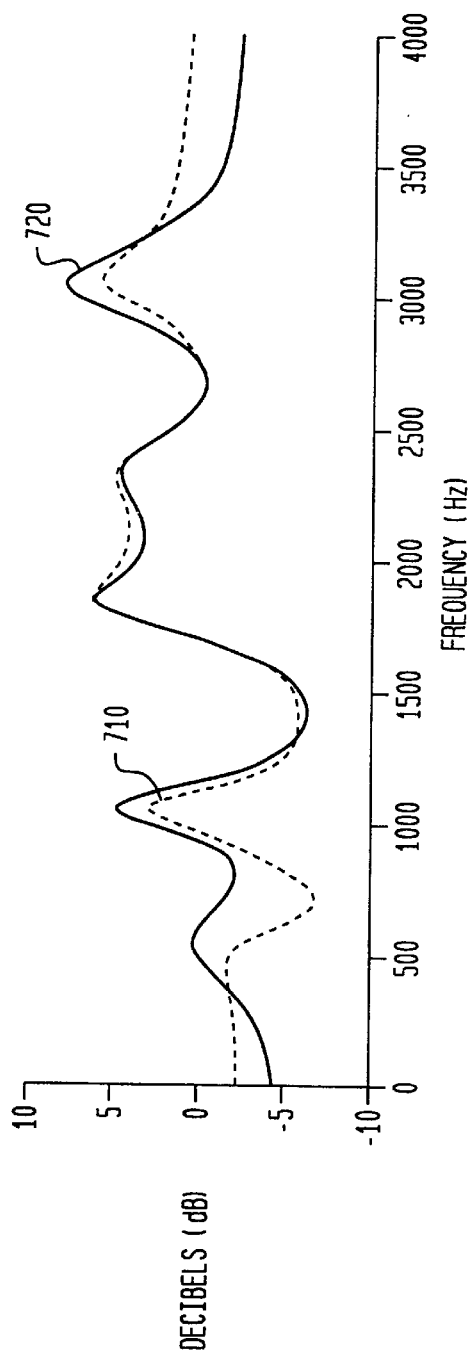

SPEAKER VERIFICATION SYSTEM USING DECISION FUSION LOGIC

GOVERNMENT PATENT RIGHTS

The U.S. Government has a paid-up license in this invention and the right in limited circumstances to require the patent owner to license others on reasonable terms as provided for by the terms of Grant No. F30602-91-C-0120 awarded by the U.S. Air Force.

BACKGROUND OF THE INVENTION

1. Field of the Invention

The present invention relates to a pattern recognition system and, in particular, to a speaker verification system which uses data fusion to combine data from a plurality of extracted features and a plurality of classifiers for accurately verifying a claimed identity.

2. Description of the Related Art

Pattern recognition relates to identifying a pattern, such as speech, speaker or image. An identified speaker pattern can be used in a speaker identification system in order to determine which speaker is present from an utterance.

The objective of a speaker verification system is to verify a speaker's claimed identity from an utterance. Spoken input to the speaker verification system can be text dependent or text independent. Text dependent speaker verification systems identify the speaker after the utterance of a predetermined phrase or a password. Text independent speaker verification systems identify the speaker regardless of the utterance. Conventional text independent systems are more convenient from a user standpoint in that there is no need for a password.

Feature extractions of speaker information have been performed with a modulation model using adaptive component weighting at each frame of speech, as described in the co-pending application entitled "Speaker Identification Verification System", U.S. Ser. No. 08/203,988, assigned to a common assignee of this disclosure and hereby incorporated by reference into this application. The adaptive component weighting method attenuates non-vocal tract components and normalizes speech components for improved speaker recognition over a channel.

Other conventional feature extraction methods include determining cepstral coefficients from the frequency spectrum or linear prediction derived spectral coding coefficients. Neural tree networks (NTN) have been used with speaker-independent data to determine discriminant based interspeaker parameters. The NTN is a hierarchial classifier that combines the properties of decision trees and neural networks, as described in A. Sankar and R. J. Mammone, "Growing and Pruning Neural Tree Networks", *IEEE Transactions on Computers*, C-42:221–229, March 1993. For speaker recognition, training data for the NTN consists of data for the desired speaker and data from other speakers. The NTN partitions feature space into regions that are assigned probabilities which reflect how likely a speaker is to have generated a feature vector that falls within the speaker's region. Text independent systems have the disadvantage of requiring a large magnitude of data for modeling and evaluating acoustic features of the speaker.

U.S. Pat. No. 4,957,961 describes a neural network which can be readily trained to reliably recognize connected words. A dynamic programming technique is used in which input neuron units of an input layer are grouped into a multilayer neural network. For recognition of an input pattern, vector components of each feature vector are supplied to respective input neuron units of one of the input layers that is selected from three consecutively numbered input layer frames. An intermediate layer connects the input neuron units of at least two input layer frames. An output neuron unit is connected to the intermediate layer. An adjusting unit is connected to the intermediate layer for adjusting the input-intermediate and intermediate-output connections to make the output unit produce an output signal. The neural network recognizes the input pattern as a predetermined pattern when the adjusting unit maximizes the output signal. About forty times of training are used in connection with each speech pattern to train the dynamic neural network.

It has been found that the amount of data needed for training and testing a verification system can be reduced by using text-dependent speaker utterances. One conventional text dependent speaker verification system uses dynamic time warping (DTW) for time aligning the diagnosis of features based on distortion, see S. Furui, "Cepstral Analysis Technique For Automatic Speaker Verification", *IEEE Transactions on Acoustics, Speech, and Signal Processing*, ASSP-29:254–272, April 1981. A reference template is generated from several utterances of a password during testing. A decision to accept or reject the speaker's claimed identity is made by whether or not the distortion of the speaker's utterance falls below a predetermined threshold. This system has the disadvantage of lacking accuracy.

Another technique using hidden Markov models (HMM) has provided improved performance over DTW systems, as described in J. J. Naik, L. P. Netsch, and G. R. Doddington, "Speaker Verification Over Long Distance Telephone Lines", *Proceedings ICASSP* (1989). Several forms of HMM have been used in text dependent speaker verification. For example, subword models, as described in A. E. Rosenberg, C. H. Lee and F. K. Soong, "Subword Unit Talker Verification Using Hidden Markov Models", *Proceedings ICASSP*, pages 269–272 (1990) and whole word models A. E. Rosenberg, C. H. Lee and S. Gokeen, "Connected Word Talker Recognition Using Whole Word Hidden Markov Models", *Proceedings ICASSP*, pages 381–384 (1991) have been considered for speaker verification. HMM techniques have the limitation of generally requiring a large amount of data to sufficiently estimate the model parameters. One general disadvantage of DTW and HMM systems is that they only model the speaker and do not account for modeling data from other speakers using the systems. The failure of discriminant training makes it easier for an imposter to break into these systems.

It is desirable to provide a pattern recognition system in which a plurality of extracted features can be combined in a plurality of pre-determined classifiers for improving the accuracy of recognition of the pattern.

SUMMARY OF THE INVENTION

Briefly described, the present invention comprises a pattern recognition system which combines a plurality of extracted features in a plurality of classifiers including classifiers trained with different and overlapping substrates of the training data for example, a "leave one out" technique, described below. Preferably, the pattern recognition system is used for speaker verification in which features are extracted from speech spoken by a speaker. A plurality of classifiers are used to classify the extracted features. The classified output is fused to recognize the similarities between the speech spoken by the speaker and speech stored in advance for the speaker. From the fused classified output a decision is made as to whether to accept or reject the speaker. Most preferably, the speech is classified with the fusion of a dynamic time warping classifier for providing validation of the spoken password and a modified neural tree network classifier for providing discrimination from other speakers. The use of a discriminant trained classifier in a speaker verification system has the advantage of accurately discriminating one speaker from other speakers.

The system can also include a preliminary determination of whether or not to accept or reject the speaker based on performing word recognition of a word spoken by the speaker, i.e., the speaker's password. If the speaker's password is accepted, the classifiers are enabled. Preferably, the classifiers are trained by applying a plurality of utterances to the classifier with one of the utterances being left out. The left out utterance can be applied to the classifier to determine a probability between 0 and 1 for identifying the speaker. The probabilities can be compared against a classifier threshold to make a decision whether to accept or reject the speaker.

The text uttered by the speaker can be speaker dependent or speaker independent. The extracted features can also be segmented into subwords. Preferably, the subword is a phoneme. Each of the subwords can be modeled with at least one classifier. Output from the subword based classifiers can be fused for providing a subword based verification system.

Preferably, the features can be extracted with a pole filtering method for decreasing channel effects on the speech. In addition, the extracted features can be adjusted with an affine transformation for reducing the mismatch between training and testing environments.

The invention will be more fully described by reference to the following drawings.

BRIEF DESCRIPTION OF THE DRAWINGS

FIG. 3 is a schematic diagram of a speaker verification module combining a plurality of extracted features with a plurality of classifiers.

FIG. 11A is a schematic diagram of a prior art channel normalization system.

FIG. 11B is a schematic diagram of a channel normalization system of the present invention.

FIG. 13A is a graph of a spectra of a frame of speech.

FIG. 13B is a graph of a spectra of a frame of speech for a normalization system of the present invention versus a frame from a prior art normalization system.

DETAILED DESCRIPTION OF THE PREFERRED EMBODIMENT

During the course of this description like numbers will be used to identify like elements according to the different figures which illustrate the invention.

Figure 1:
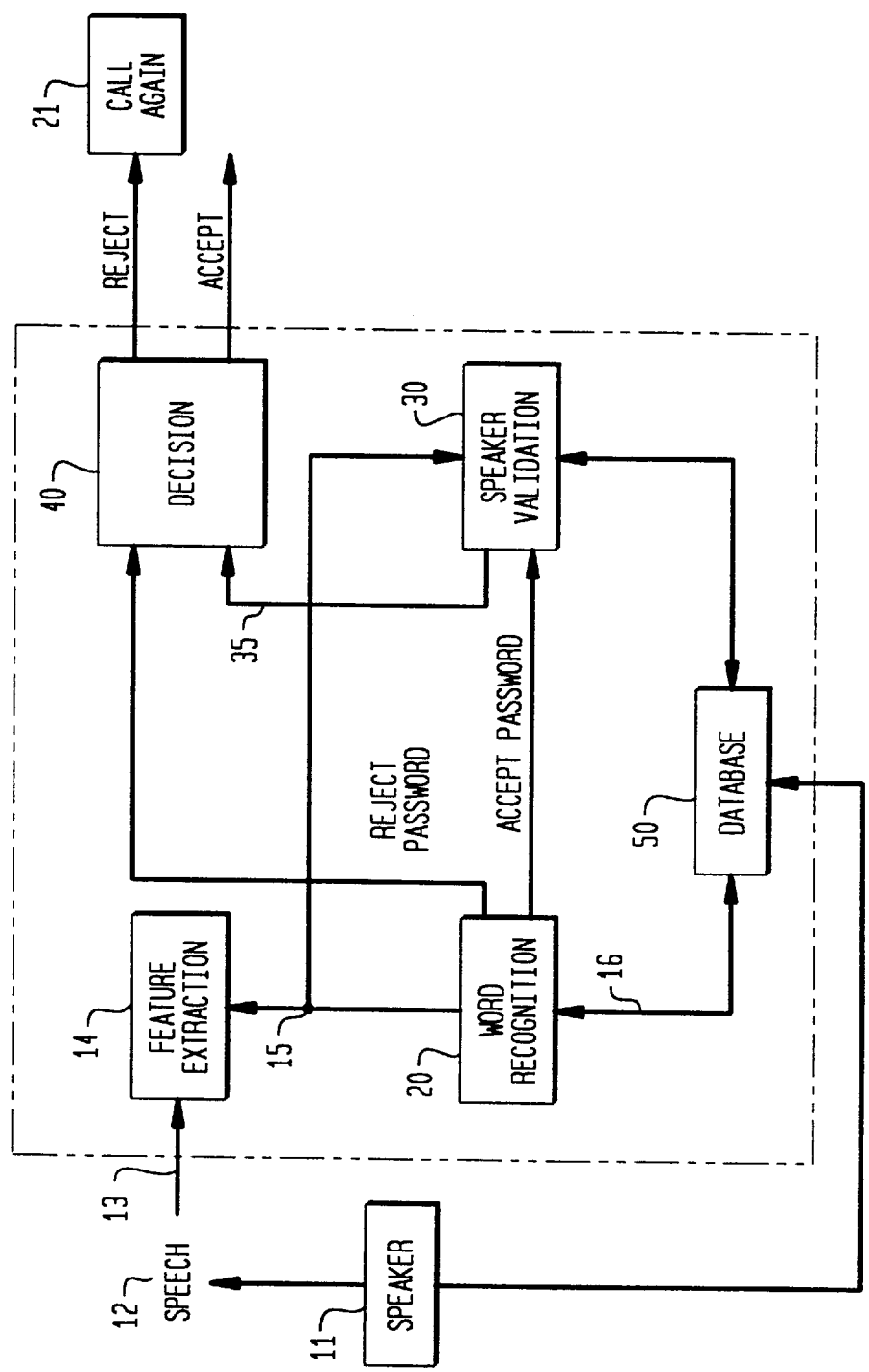
FIG. 1 is a schematic diagram of a speaker verification system in accordance with the teachings of the present invention.

FIG. 1 illustrates a schematic diagram of an embodiment of a speaker verification system 10 in accordance with the teachings of the present invention. Speaker 11 utters speech 12. Speech 12 is applied as speech input signal 13 to feature extraction module 14. Feature extraction module 14 determines speech feature vectors 15 representative of characteristic parameters of speech input signal 13. Preferably, speech feature vectors 15 are determined with a linear prediction (LP) analysis to determine LP cepstral coefficients. The LP cepstral coefficients can be band pass liftered using a raised sine window with conventional techniques for providing improved recognition of the cepstral coefficients.

Alternatively, or in combination with the LP analysis, feature extraction module 14 can extract features with a plurality of methods. For example, an adaptive component weighting method as described in the above-identified U.S. Ser. No. 08/203,988 can be used to extract speech feature vectors 15. The adaptive component weighting technique enhances extracted features by applying weightings to predetermined components of the speech input signal 13 for producing a normalized spectrum which improves vocal tract features of the signal while reducing non-vocal tract effects. Feature extraction module 14 can also generate other linear prediction derived features from linear prediction (LP) coefficients using conventional methods such as log area ratios, line spectrum pairs and reflection coefficients. Feature extraction module 14 can also generate Fast Fourier transform (FFT) derived spectral features on linear and log frequency scales, fundamental frequency (pitch), loudness coefficient and zero crossing rates.

Word recognition module 20 receives speech feature vectors 15 and compares the speech feature vectors 15 with data 16 related to the speech feature vectors 15. Data 16 can be stored in database 50. For example, speaker 11 can utter a password as speech 12. Speech feature vectors 15 represent the utterance of the password for speaker 11. A closed set of passwords can be represented by data 16 and stored in database 50. The closed set of passwords corresponds to a set of speaker identities, including the password for speaker 11. At word recognition module 20, if the received speech feature vectors 15 at word recognition module 20 match data 16 stored in database 50, for example, a match of a password for a claimed identity, speaker verification module 30 is enabled. If the received speech feature vectors 15 do not match data 16 stored in database 50, for example, no match of a password is stored in database 50 for the claimed identity, user 11 can be prompted to call again in module 21.

Speaker verification module 30 preferably uses data fusion to combine a plurality of classifiers with speech feature vectors 15, which technique is described in detail below. Fused classifier outputs 35 of speaker verification module 30 is received at decision fusion logic module 40. Decision fusion logic module 40 provides the final decision on whether to accept or reject the claimed identity of speaker 11, thereby verifying the speaker's claimed identity.

Figure 2A:
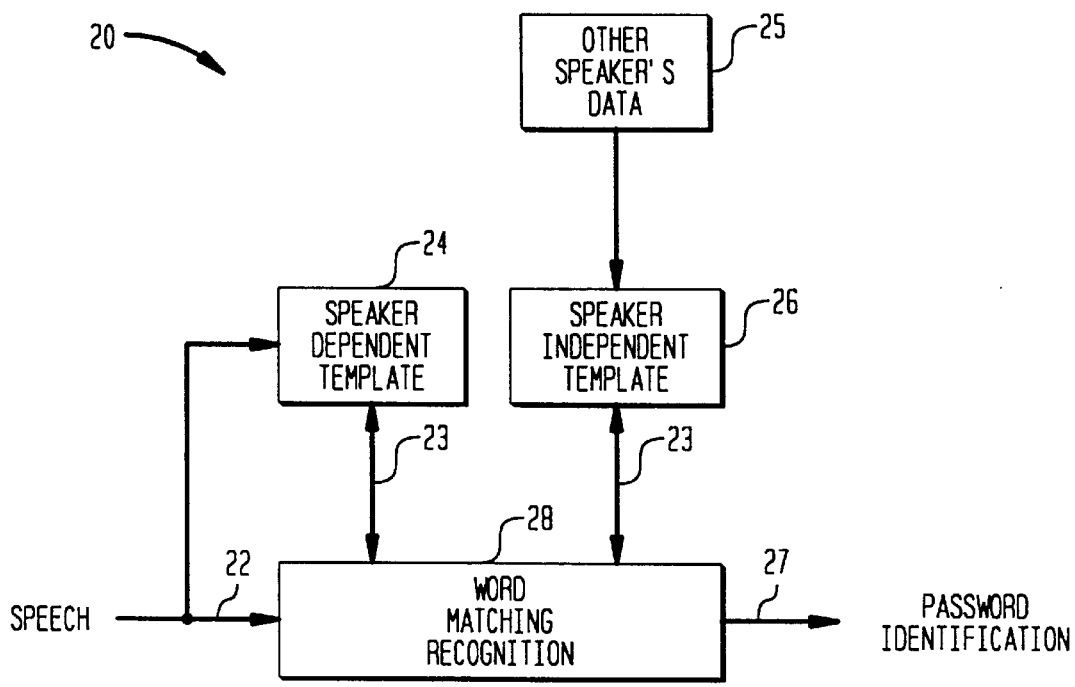
FIG. 2A is a schematic diagram of the word recognition module shown in FIG. 1 during training of the system.
Figure 2B:
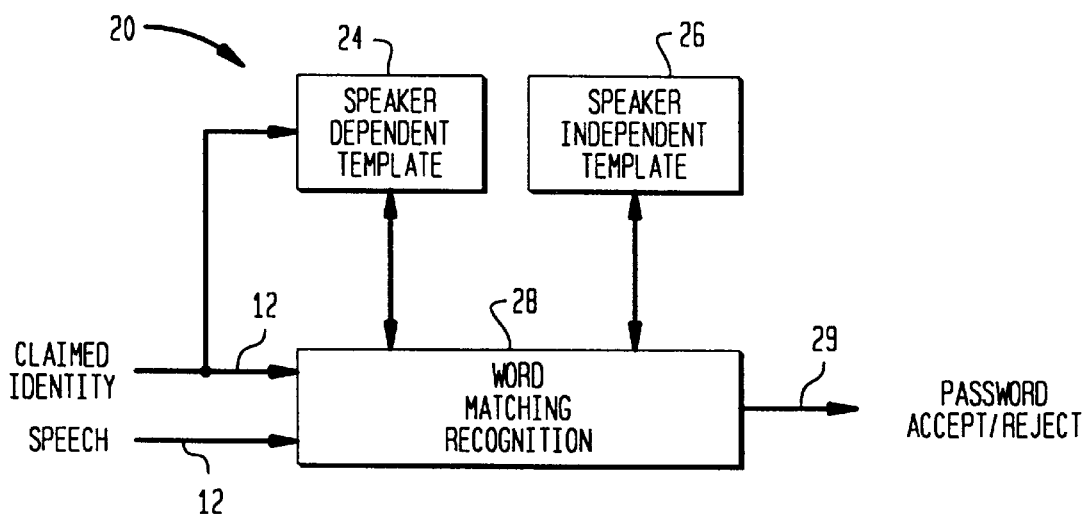
FIG. 2B is a schematic diagram of the word recognition module shown in FIG. 1 during testing of the system.

FIGS. 2A and 2B illustrate word recognition module 20 during enrollment of speaker 11 and testing of speaker 11, respectively. During enrollment of speaker 11 in speaker verification system 10, training speech 22 is uttered by speaker 11. For example, training speech 22 can comprise four repetitions of a password for speaker 11. Each of the repetitions is recognized with word matching recognition module 28. Preferably, a DTW-based template matching algorithm is used in word matching recognition module 28 to produce recognized words 23. Recognized words 23 are clustered into a speaker dependent template 24. Speaker independent templates 26 can also be generated with recognized words 23 and data of repetitions of the same training speech 22 spoken by other speakers 25 using speaker verification system 10. A majority vote on recognized words 23 from word recognition matching module 28 can be used to identify a user's password 27 for speaker 11.

During testing of speaker 11, speech 12 is spoken by user 11 and is compared against speaker dependent template 24 and speaker independent template 26 in word recognition matching module 28. If speech 12 represents password 27 of speaker 11 and matches either the speaker dependent word template 24 or speaker independent word template 26, an "accept" response is outputted to line 29. If speech 12 does not match either the speaker dependent word template 24 or the speaker independent word template 26, a "reject" response is outputted to line 29.

Preferably, speaker verification module 30 uses data fusion to combine a plurality of extracted features 60, 61 and 62 with a plurality of classifiers 70, 71 and 72, as shown in FIG. 3. Features 60, 61 and 62 can represent speech feature vectors 15 extracted with varying predetermined extraction methods as described above. Classifiers 70, 71 and 72 can represent varying predetermined classification methods such as, for example, a neural tree network (NTN), multilayer perceptron (MLP), hidden markov Models (HMM), dynamic time warping (DTW), Gaussian mixtures model (GMM) and vector quantization (VQ). In an alternate embodiment, features 60, 61 and 62 can represent extraction features of an alternative pattern such as speech or image and classifiers 70, 71 and 72 can represent predetermined classification methods for the speech or image patterns. Output 73, 74 and 75 from respective classifiers 70, 71 and 72 can be combined in decision fusion logic module 40 to make a final decision on whether to accept to accept or reject speaker 11. Decision fusion module 40 can use conventional techniques, like linear opinion pool, log opinion pool, Baysian combination rules; voting method or an additional classifier to combine classifiers 70, 71 and 72. It will be appreciated that any number of features or classifiers can be combined. The classifiers can also include classifiers trained with different and overlapping substrates of training data, for example, the leave one out technique described below.

Figure 4:
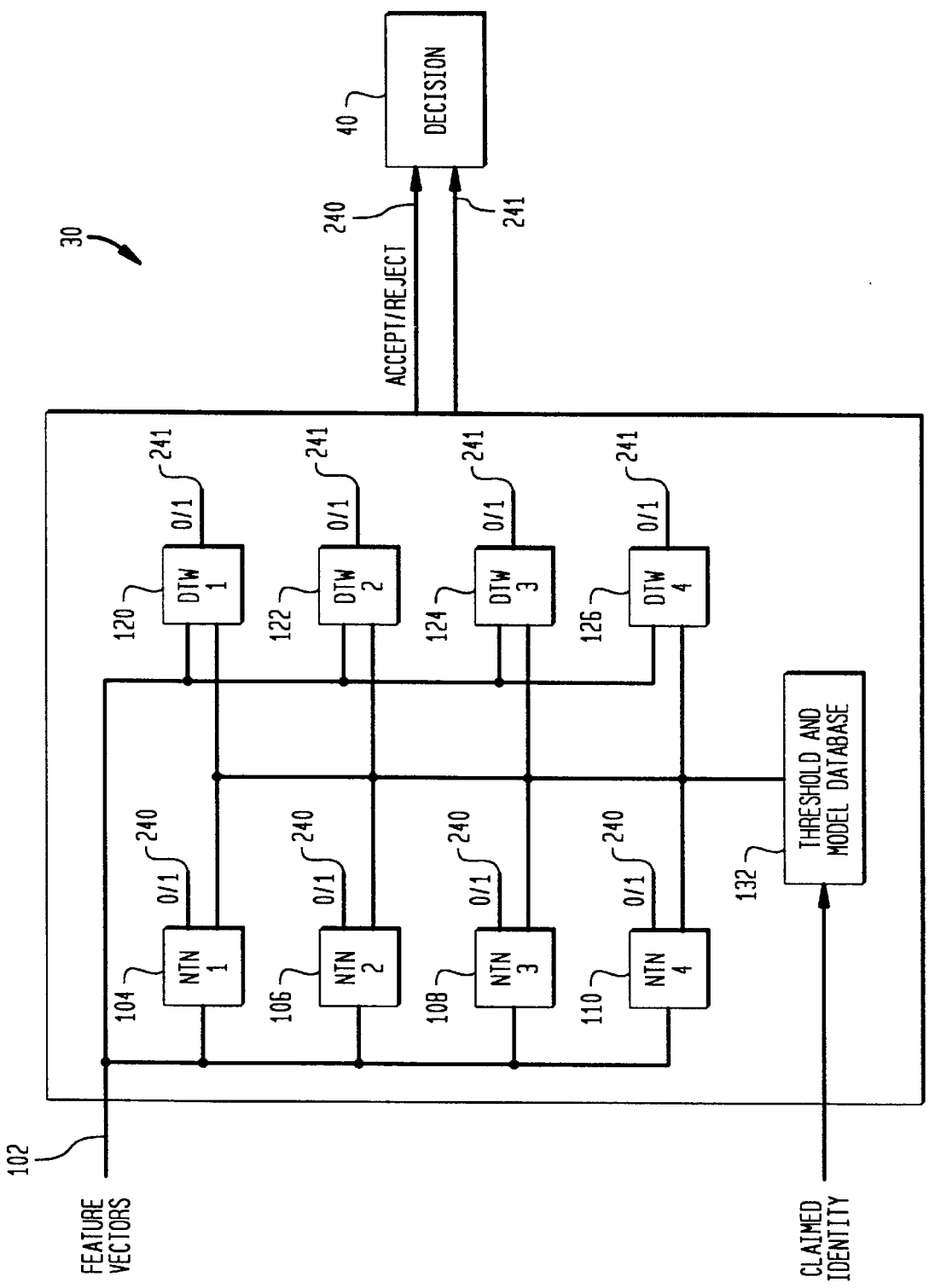
FIG. 4 is a schematic diagram of the combination of modified neural tree network and dynamic time warping classifiers used in the speaker verification module shown in FIG. 1.

FIG. 4 illustrates a preferred speaker verification module 30 for use in the speaker verification system of the present invention. Speech feature vectors 102 are inputted to Neural Tree Network (NTN) classifiers 104, 106, 108 and 110 and Dynamic Time Warping (DTW) classifiers 120, 122, 124 and 126. During classification, each NTN classifier 104, 106, 108 and 110 and 126 determines if feature vector 102 is above a predetermined respective threshold, "$T_{NTN}$" of NTN stored in data base 132. Each DTW classifier 120, 122, 124 and 126 determines if feature vector 102 is above a predetermined respective threshold "$T_{DTW}$" of DTW stored in data base 132. If feature vectors 102 are above respective thresholds $T_{NTN}$ and $T_{DTW}$, a binary output of "1" is outputted to line 240 and line 241, respectively. If feature vectors 102 are less than predetermined respective threshold $T_{NTN}$ and $T_{DTW}$ a binary output of "0" is outputted to line 240 and line 241, respectively.

During testing of speaker 11 with speaker verification system 10, decision module 40 receives the binary outputs from line 240 and 241. In a preferred embodiment of decision module 40, a majority vote can be taken on the binary outputs in decision module 240 to determine whether to accept or reject speaker 11. In this embodiment, if the majority of the binary outputs are "1", the speaker is accepted and if the majority of the binary outputs are "0", the speaker is rejected.

Figure 5:
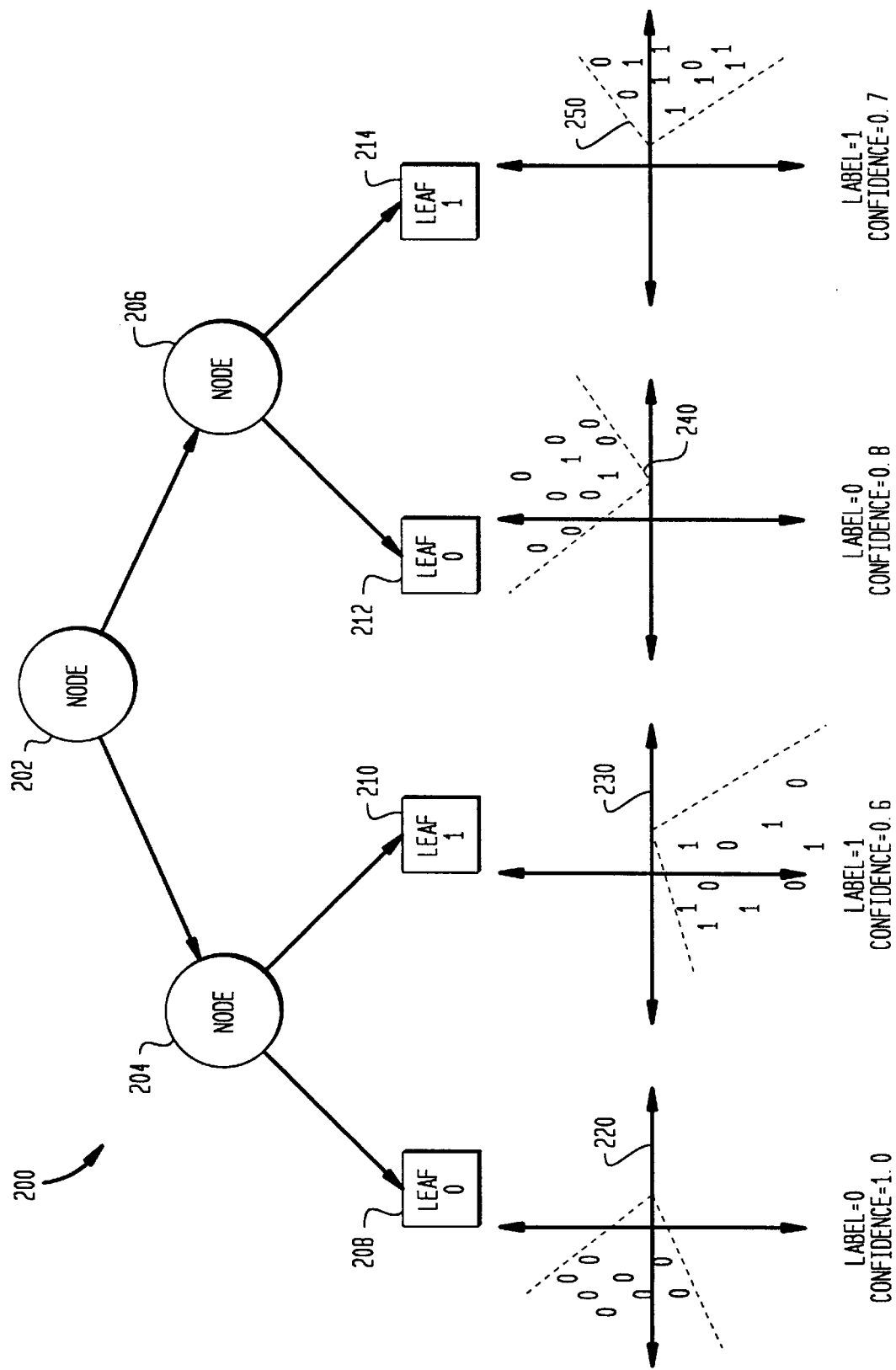
FIG. 5 is a schematic diagram of a modified neural tree network (MNTN) classifier used in the speaker verification module shown in FIG. 1.

A preferred classifier designated as a modified neural tree network (MNTN) 200 can be used as a discriminant based classifier in speaker verification module 30. MNTN 200 has a plurality of interconnected nodes 202, 204 and 206, as shown in FIG. 5. Node 204 is coupled to leaf node 208 and leaf node 210 and node 206 is coupled to leaf node 212 and leaf node 214. A probability measurement is used at each of leaf nodes 208, 210, 212 and 214 because of "forward pruning" of the tree by truncating the growth of MNTN 200 beyond a predetermined level.

MNTN 200 is trained for speaker 11 by applying data 201 from other speakers 25 using speaker verification system 10. Extracted feature vectors 15 for speaker 11 identified as "$S_i$", are assigned labels of "1" and extracted feature vectors for other speakers 25 using speaker verification system 10 are assigned labels of "0". Data 220, 230, 240 and 250 are applied respectively to leaf nodes 208, 210, 212 and 214 of extracted feature vectors. A vote is taken at each of leaf nodes 208, 210, 212 and 214. Each of leaf nodes 208, 210, 212 and 214 is assigned the label of the majority of the vote. A "confidence" is defined as the ratio of the number of labels for the majority to the total number of labels. For example, data 220 which comprises eight "0" features is assigned a label of "0" and a confidence of "1.0". Data 230 which comprises six "1" features and four "0" features is assigned a label of "1" and a confidence of "0.6".

A trained MNTN 200 can be used in speaker verification module 30 to determine a corresponding speaker score from a sequence of feature vectors "X" from speech 12. The corresponding speaker score $P_{MNTN}(X/S_i)$ can be determined with the following equation:

$$P_{MNTN}(X|S_i) = \frac{\sum_{j=1}^{M} c_j^1}{\sum_{j=1}^{N} C_j^0 + \sum_{j=1}^{N} c_j^1}$$

where speaker 11 is identified as $S_i$, $c^1$ are the confidence score for speaker 11, $c^0$ is the confidence score for all other speakers. M and N correspond to the numbers of vectors classified as "1" and "0", respectively.

Figure 6:
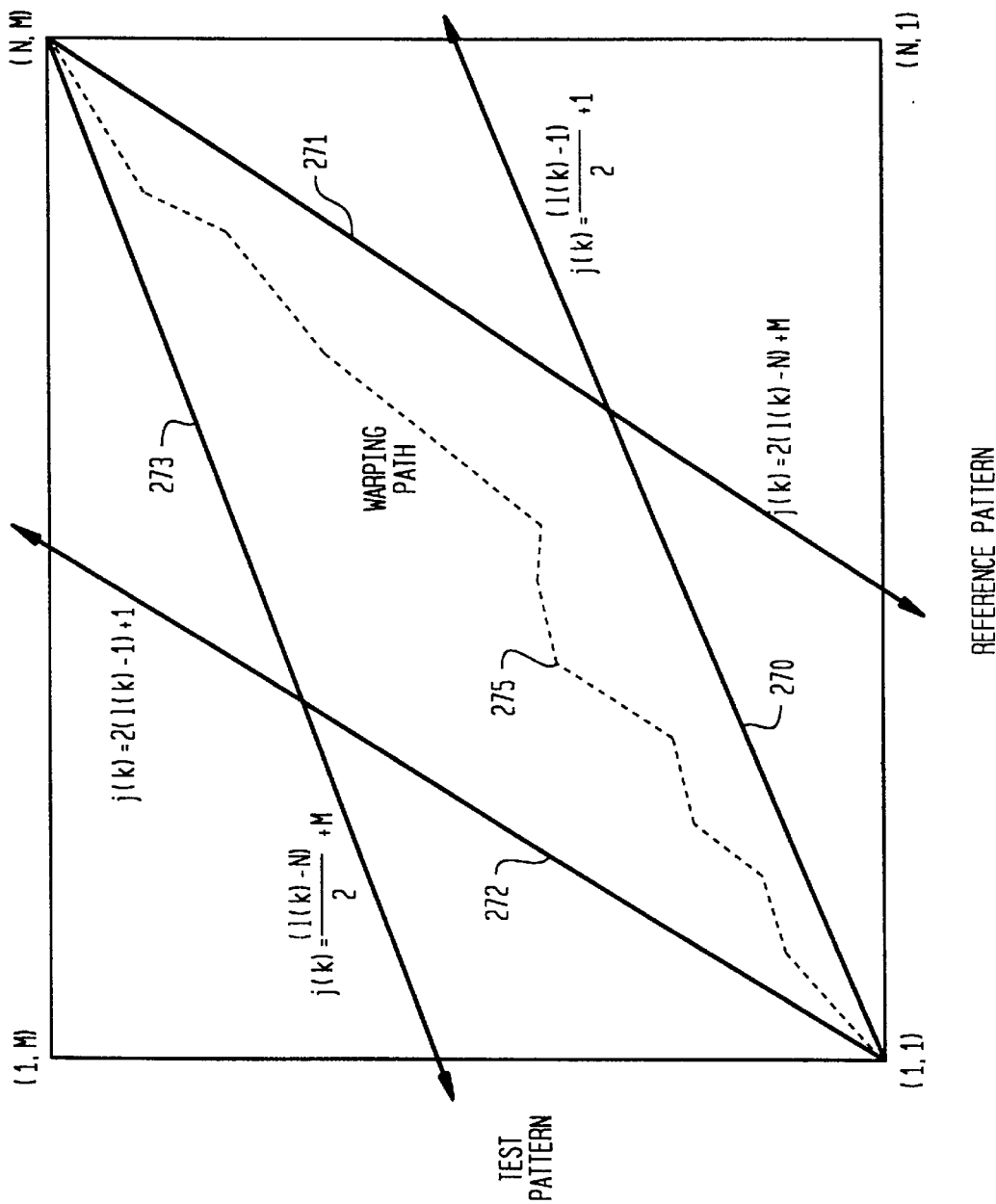
FIG. 6 is a schematic diagram of a dynamic time warping (DTW) classifier used in a speaker verification module shown in FIG. 1.

A preferred DTW classifier uses a distortion based approach for time aligning two waveforms or two feature patterns, as shown in FIG. 6. The waveforms are represented by a reference pattern of speech feature vectors 15 on the X axis and a test pattern of speech feature vectors 15 on the Y axis, wherein N represents the number of reference patterns and M represents the number of test patterns. Global constraints 270, 271, 272 and 273 represent limits for the dynamic time warping path 275. Dynamic time warping path 275 can be determined by conventional methods such as described in H. Sakoe and S. Chiba, "Dynamic programming algorithm optimization for spoken word recognition", *IEEE Trans. on Acoustics, Speech and Signal Processing,* vol. ASSP-26, no. 1, pgs. 43–49, February 1978.

It is preferable to combine a classifier which is based on a distortion method, i.e., a DTW classifier to provide information related to the speaker and a classifier based on a discriminant method, NTN or MNTN, classifiers to provide information related to the speaker with respect to other speakers' using the speaker verification system 10. The fusion of a DTW classifier and a MNTN or NTN classifier also has the advantage that the DTW classifier provides temporal information which is not generally part of the NTN or MNTN classifiers.

Figure 7B:
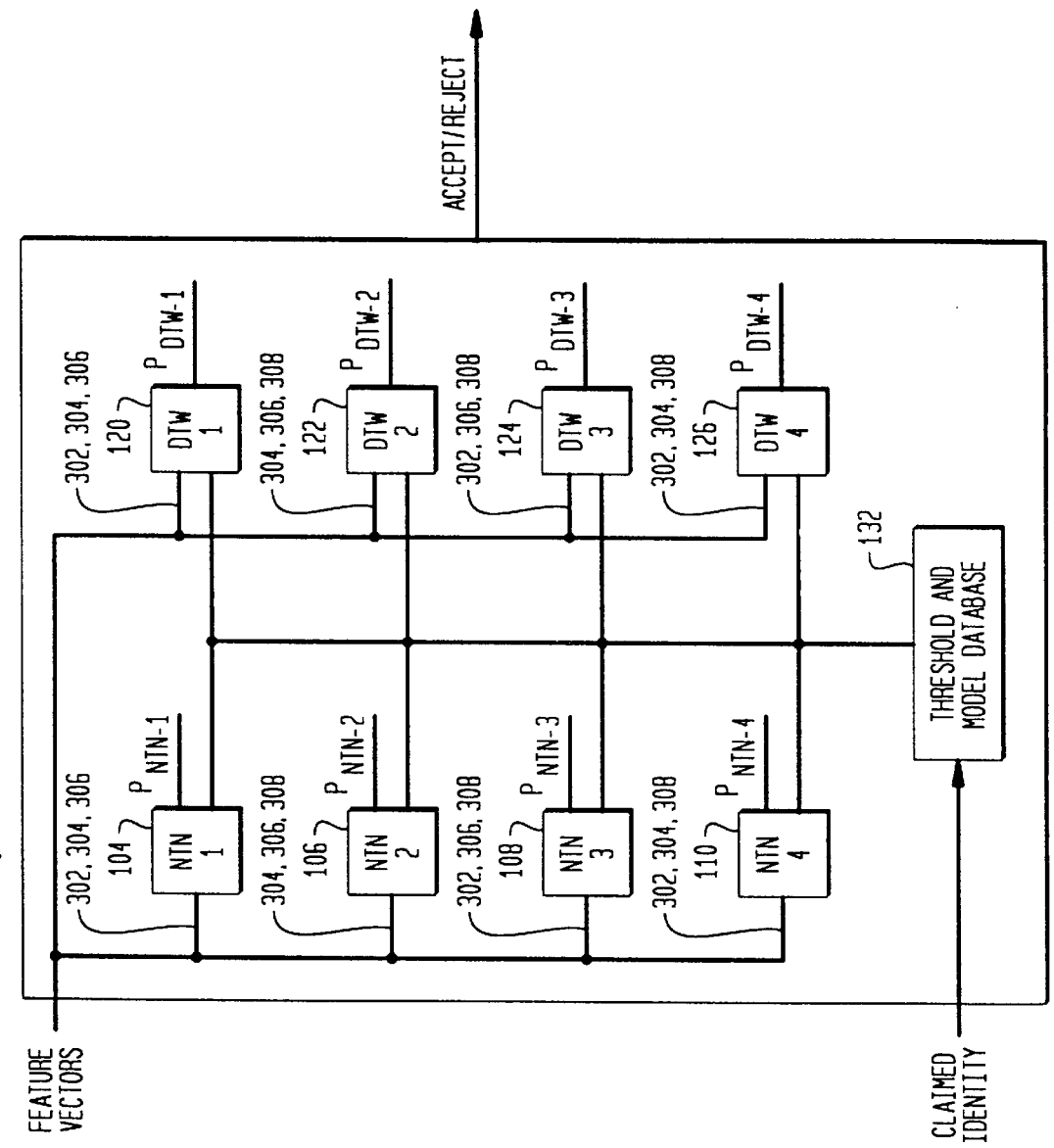
FIG. 7B is a schematic diagram of the application of the plurality of utterances shown in FIG. 7A in the speaker verification module.
Figure 7A:
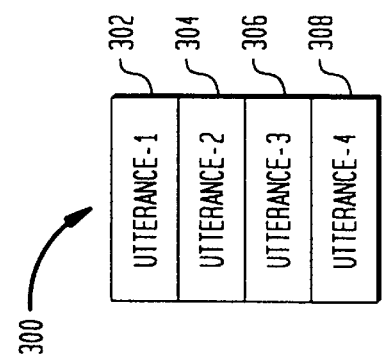
FIG. 7A is a schematic diagram of a plurality of utterances used in training of the speaker verification module.

NTN classifiers 104, 106, 108 and 110 and DTW classifiers 120, 122, 124 and 126 can be trained with training module 300, shown in FIGS. 7A and 7B. Training module 300 can also be used for training MNTN classifiers, DTW classifiers and other classifiers which can be used in speaker verification module 30. A resampling technique identified as a "leave one out" technique is preferably used in training module 300. A predetermined number of utterances of training speech are received from speaker 11. In this embodiment, four utterances, defined as 302, 304, 306 and 308 of speech 22, such as the speaker's password are used. A combination of three of the four utterances, with one utterance being left out, are applied to pairs of NTN classifiers 104, 106, 108 and 110 and DTW classifiers 120, 122, 124 and 126. The three utterances are used for training the classifiers and the remaining utterance is used as an independent test case. For example, utterances 302, 304 and 306 can be applied to NTN classifier 104 and DTW classifier 120; utterances 304, 306 and 308 can be applied to NTN classifier 106 and DTW classifier 122, utterances 302, 306 and 308 can be applied to NTN classifier 108 and DTW classifier 124, and utterances 302, 304 and 308 can be applied to NTN classifier 110 and DTW classifier 126.

After application of the respective three utterances to each pair of NTN classifiers 104, 106, 108 and 110 and DTW classifiers 120, 122, 124 and 126, the left out utterance is applied to each respective pair of NTN classifiers 104, 106, 108 and 110 and DTW classifiers 120, 122, 124 and 126, as shown in FIG. 7C. For example, utterance 308 is applied to NTN classifier 104 and DTW classifier 120, utterance 302 is applied to NTN 106 and DTW 122, utterance 304 is applied to NTN 108 and DTW 124 and utterance 306 is applied to NTN 110 and DTW 126. A probability, P, between 0 and 1 designated as 310, 312, 314 and 316 is calculated. Probabilities 310, 312, 314 and 316 are compared against a threshold $T_{DTW}$ and probabilities 317, 318, 319 and 320 $T_{NTN}$ in vote module 321 of decision fusion logic module 40.

Figure 8:
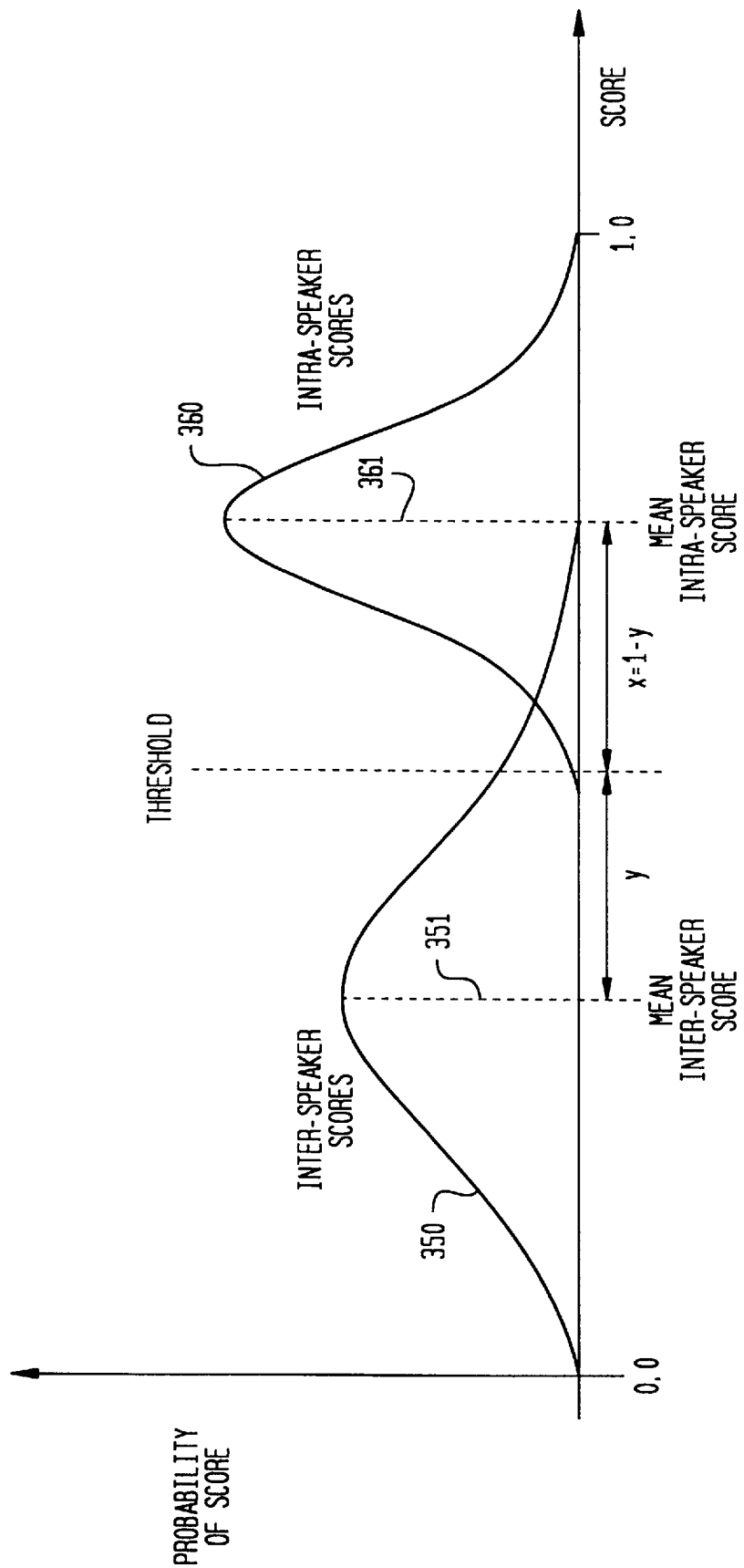
FIG. 8 is a graph of a speaker and other speaker scores.

FIG. 8 is a graph of intraspeaker scores from other speakers 25 and interspeaker scores from speaker 11 which can be used to determine thresholds for the classifiers used in speaker verification system 10, for example, thresholds $T_{DTW}$ and $T_{NTN}$. The interspeaker scores of speaker 11 for speech 12 are represented by graph 350 having mean speaker score 351. Intraspeaker scores of other speakers 25 for speech 12 are represented by graph 360 having mean speaker score 361. Thresholds, T, can be determined from the following equation:

$$T = x*\text{interspeaker} + y*\text{interspeaker}$$

A soft score, S, can be determined by the amount that speech 12 is greater than or less than Threshold, T. A score of each classifier, C, is between zero and one with zero being the most confident reject and one being the most confident accept. The accept confidence, $C_{accept}$, is between the threshold T, and one can be defined from the following equation:

$$C_{accept} = \frac{S-T}{1-T}$$

A reject confidence, $C_{reject}$, is between 0 and threshold T can be defined as:

$$C_{reject} = \frac{T-S}{T}$$

Figure 9:
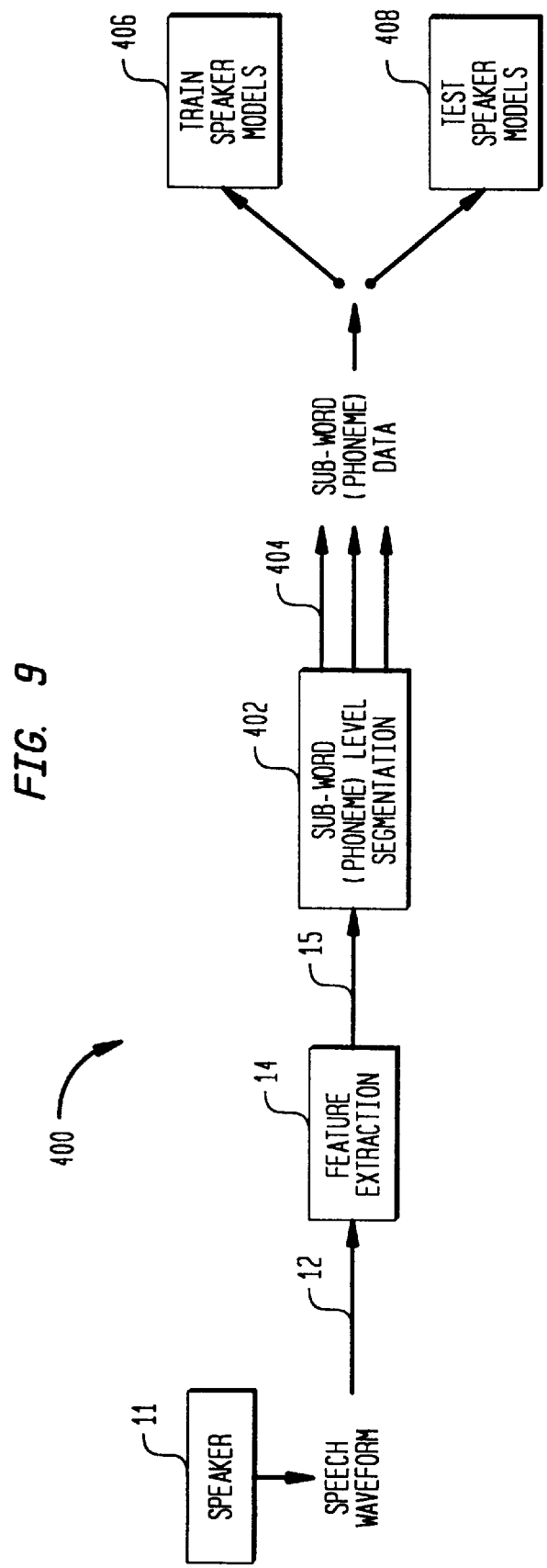
FIG. 9 is a schematic diagram of a subword based speaker verification system.

FIG. 9 illustrates a schematic diagram of a subword based speaker verification system 400. After extraction of speech feature vectors 15 in feature extraction module 14, speech feature vectors 15 are segmented into subwords 404 in subword segmentation module 402. Preferably, subwords 404 are phonemes. Subwords 404 can be applied to train speaker module 406 and test speaker module 408.

Figure 10A:
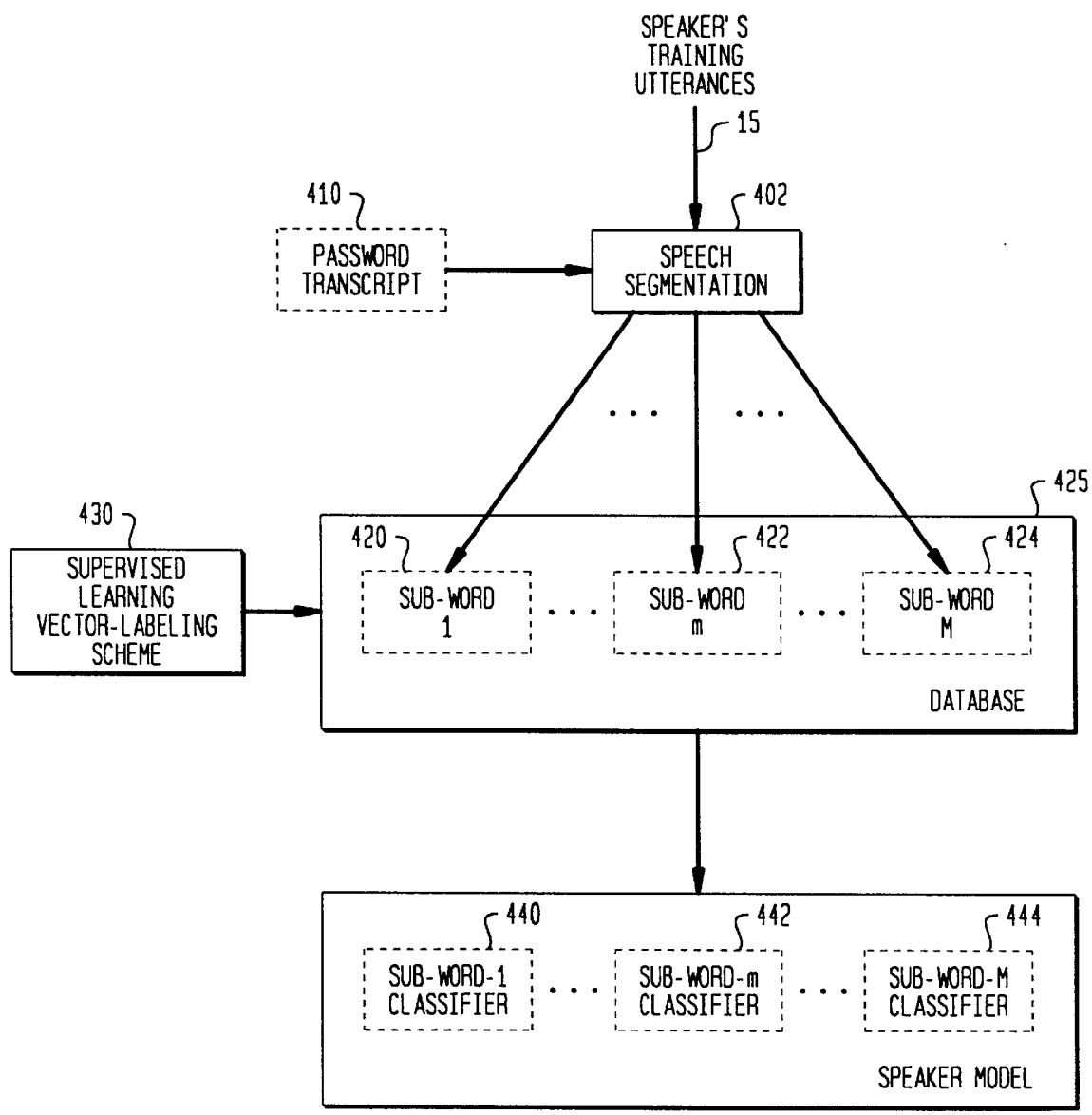
FIG. 10A is a schematic diagram of a subword based classification system during training.

FIG. 10A is a schematic diagram of the subword based speaker verification 400 system during application of the train speaker module 406. Speaker extraction features 15 depicting speaker 11 training utterances and a password transcript 410 are applied to subword phoneme level segmentation module 402. Password transcript 410 can be spoken by speaker 11, inputted by a computer or scanned from a card, or the like. Speech segmentation module 402 segments speaker extraction features 15 into subwords 1 to M, for example, subword "l" in module 420, subword "m" in module 422 and subword "M" module 424 in which M is the number of segmented subwords. Subwords 420, 422 and 424 can be stored in subword database 425. Supervised learning vector labeling scheme 430 determines the labels for training speech vectors as "0" or "1" for training classifiers 440, 442 and 444. For example, all subwords for other speakers 25 can be labelled as "0" and subwords for speaker 15 can be labelled as "1". Alternatively, the closest phonemes can be searched in database 425. Subword classifiers 440, 442 and 444 are applied to respective subwords 420, 422 and 424 for classifying each of the subwords. Preferably, subword classifiers 440, 442 and 444 use NTN and MNTN classification methods.

Figure 10B:
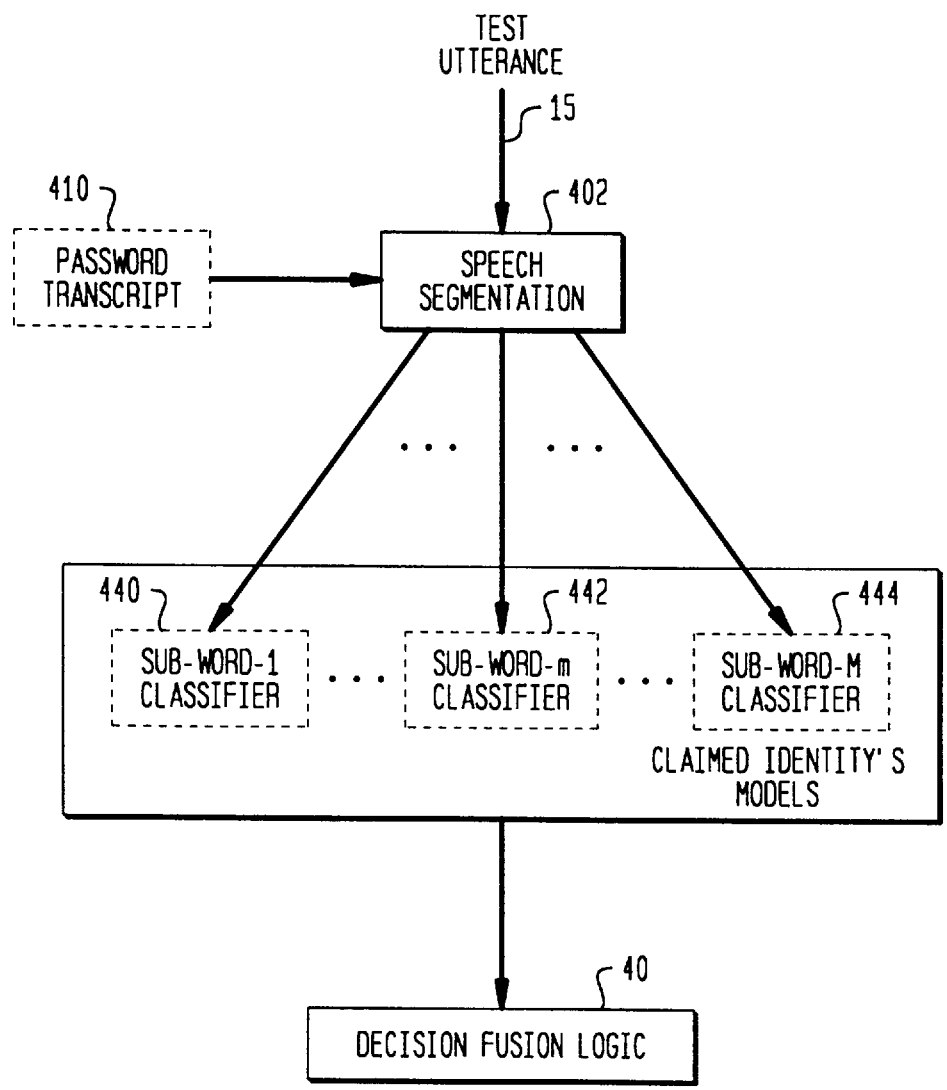
FIG. 10B is a schematic diagram of a subword based classification system during testing.

FIG. 10B is a schematic design of the subword based speaker verification system 400 during application of the test speaker module 408. Speaker extraction feature 15 depicting speaker 11 test utterances are applied to subword phoneme level segmentation module 402 with password transcript 410. Subword classifiers 440, 442 and 444 classify respective subwords 420, 422 and 424 determined from extracted speaker features 15 depicting speaker 11 test utterances. Output 445 from classifier 440, 442 and 444 is applied to decision fusion logic module 40 for determining whether or not to accept or reject speaker 11 based on fused output from classifiers 440, 442, 444 based a calculated accept confidence, $C_{accept}$, as described above.

A preferred method which can be described as "pole filtering" can be used in feature extraction module 14 for yielding speech feature vectors 15 which are robust to channel differences. Pole filtering performs channel normalization using intelligent filtering of the all pole linear prediction (LP) filter.

Clean speech $C_S$ is convolved with a channel with impulse response h, then a channel cepstrum of the ordinary cepstral mean can be represented by, $$C_s = \sum_{m=1}^{M} s_m + h,$$

where $$S_s = \sum_{m=1}^{M} S_m$$

corresponds to the cepstral mean component solely due to underlying clean speech. The component due to clean speech should be zero-mean in order for the channel cepstrum estimate $c_S$ to correspond to cepstral estimate, h, of the actual underlying convolution distortion.

It can be empirically shown that the mean cepstrum component due to clean speech is never zero for short utterances and can be the case for training and testing of speaker verification system 10.

A prior art channel normalization system 500 is shown in FIG. 11A in which speech is applied to intraframe weighting module 502. Adaptive component weighting (ACW) is an example of an intraframe weighting for channel normalization. Weighted speech 504 is received at interframe processing module 506 for removing additional channel effects. One conventional interframe method for removing channel effects is by cepstral mean substraction (CMS). Since the channel cepstrum comprises a gross spectral distribution due to channel as well as speech, the conventional elimination of a distorted estimate of the channel cepstrum from the cepstrum of each speech frame corresponds to effectively deconvolving an unreliable estimate of the channel.

FIG. 11B illustrates a channel normalization system 600 of the present invention. Speech 12 is applied to channel estimate pole filtering module 602. Pole filtering de-emphasizes the contribution of the invariant component due to speech $s_S$. The refined channel estimate is used to normalize the channel. Preferably, the refining of the channel cepstrum can be performed by an iterative manner.

The estimate of the channel cepstrum, $c_S$, depends upon the number of speech frames available in the utterance. In the case where the speech utterance available is sufficiently long, it is possible to get an estimate of the channel cepstrum that approximate the true channel estimate, h. In most practical situations, the utterance durations for training or testing are never long enough to allow for $s_S \rightarrow 0$. The cepstral mean estimate can be improved by determining the dominance of the poles in the speech frame and their contribution to the estimate of the channel cepstrum.

The effect of each mode of the vocal tract on the cepstral mean is determined by converting the cepstral mean into linear prediction coefficients and studying the dominance of corresponding complex conjugate pole pairs. A spectral component, for a frame of speech, is most dominant if it corresponds to a complex conjugate pole pair closest to the unit circle (minimum bandwidth) and least dominant if it corresponds to a complex conjugate pole pair furthest from the unit circle (maximum bandwidth).

Constraining the poles of speech in order to acquire a smoother and hence a more accurate inverse channel estimate in the cepstral domain, corresponds to a modified cepstral mean, $$c_S^{pf}$$

that de-emphasizes the cepstral bias related to the invariant component due to the speech. The refined cepstral mean removal, devoid of the gross spectral distribution component due to speech offers an improved channel normalization scheme.

Figure 12:
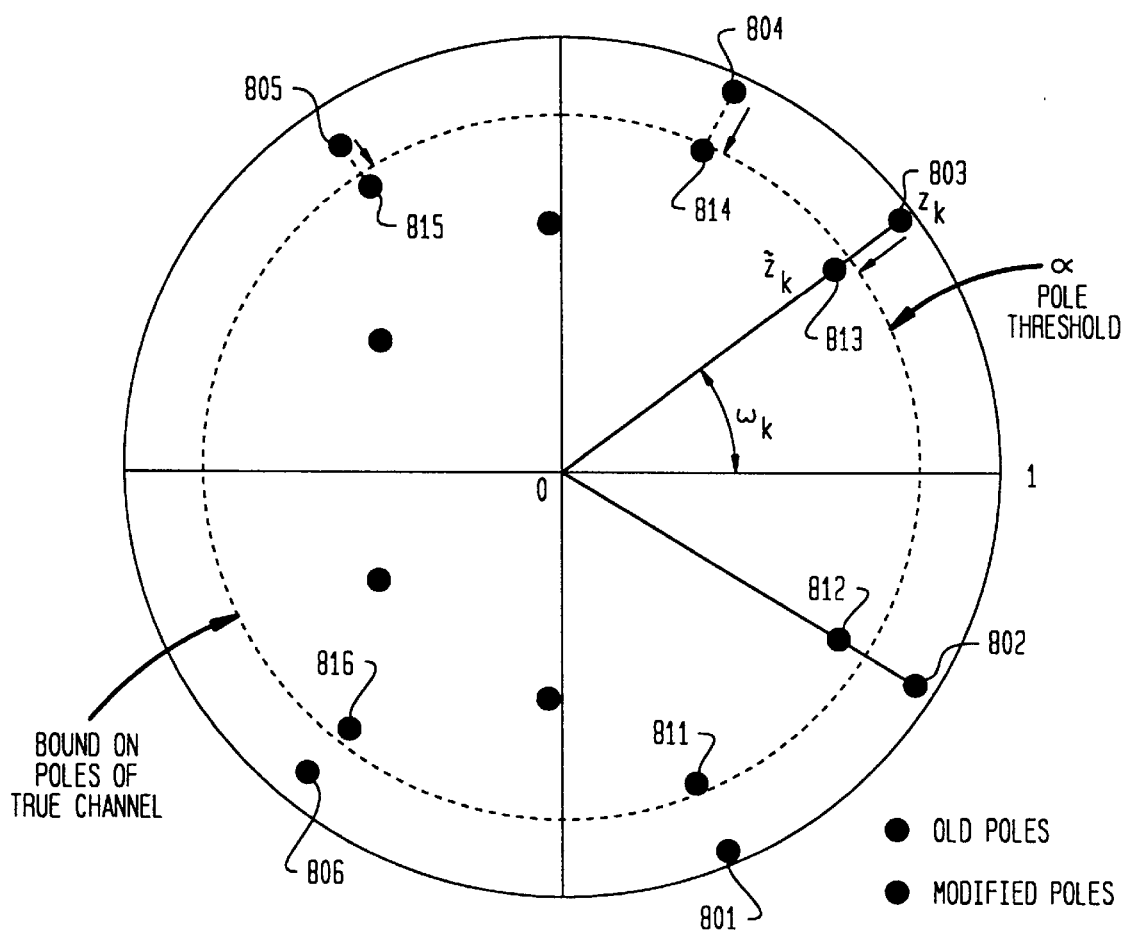
FIG. 12 is a graph of a pole filtering channel normalization.

The channel estimate best determined from channel poles filtering module 602 is combined with speech 12 in deconvulation module 730 for deconvulation in the time domain to provide normalized speech 735. Conventional interframe coupling 502 and interference processing 506 can be applied to normalized speech 735 to provide channel normalized speech feature vector 740. Speech feature vector 740 can be applied in a similar manner as speech feature vectors 15 shown in FIG. 1. One preferred method for improving the estimate of the channel uses pole filtered cepstral coefficients, PFCC, wherein, the narrow band poles are inflated in their bandwidths while their frequencies are left unchanged, as shown in FIG. 12. Poles 801, 802, 803, 804, 805, 806, are moved to modified poles 811, 812, 813, 814, 815 and 816. The effect is equivalent to moving the narrow band poles inside the unit circle along the same radius, thus keeping the frequency constant while broadening the bandwidths.

Pole filtered cepstral coefficients, PFCC, are determined for speech concurrently with speech feature vectors 15. Pole filtered cepstral coefficients, PFCC, are determined by analyzing if a pole in a frame 12 has a bandwidth less than a pre-determined threshold, t. If the speech 12 is less than the predetermined threshold and the bandwidth of that pole is clipped to threshold, t. The pole filtered cepstral coefficients can be used to evaluate the modified cepstral means. An improved inverse filter estimate is obtained by using means of Pole Filtered Cepstral Coefficients PFCCs which better approximates the true inverse channel filter. Subtracting the modified cepstral mean from cepstral frames of speech preserves the spectral information while more accurately compensating for the spectral tilt of the channel.

FIG. 13A illustrates a sample spectra 700 of a frame of speech. FIG. 13B illustrates spectra 710 of a prior art cepstral mean $C_S$ subtracted from spectra 700. Spectra 720 is a pole filtered modified cepstral mean $c_S^{pf}$ subtracted from spectra 700. Spectra 720 shows improved spectral information over spectra 710.

Figure 14:
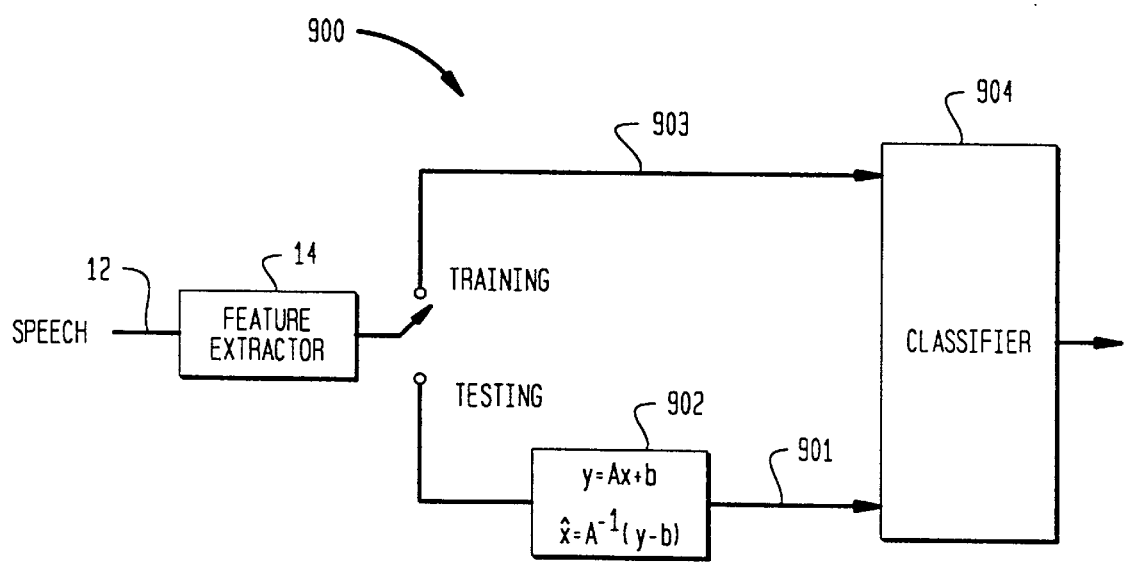
FIG. 14 is a schematic diagram of an affine transformation system.

FIG. 14 illustrates affine transformation system 900 which can be used with training and testing of speaker verification system 10. The mismatch between the training and testing environments can be reduced by performing an affine transformation on the cepstral coefficients extracted with feature extraction module 14. An affine transform y of vector x is defined as $$y = Ax + b$$

where A is a matrix representing a linear transformation and b a non-zero vector representing the translation, y is the testing data and x corresponds to the training data. In the speech processing domain, the matrix A models the shrinkage of individual cepstral coefficients due to noise and the vector b accounts for the displacement of the cepstral mean due to the channel effects.

Singular value decomposition (SVD) describes the geometry of affine transform with the following equation:

$$y = U\Sigma V^T x + b$$

where U and $V^T$ are unitary matrices and $\Sigma$ is diagonal. The geometric interpretation is that x is rotated by $V^T$, rescaled by $\Sigma$, and rotated again by U. There is also a translation introduced by the vector b.

It has been found that each cepstral coefficient is scaled in practice by a different value and accompanying the rescaling of cepstral coefficients is a slight change of the angles. A noisy cepstral vector $c_{ns}$ can be represented as the multiplication of the clean cepstrum vector c with a matrix, i.e., $$c_{ns} = Ac.$$

To simultaneously represent the distortions caused by both channel and noise, an affine mapping can be used represented by $$c' = Ac + b.$$

The affine transform parameter of x is defined from the affine transform, $$\hat{x} = A^{-1}(y - b)$$

wherein x is an equivalent to x.

The affine transform parameters A and b can be found by using the least squares method to solve the above equation on the training or cross-validation data set.

During the training of speaker verification system 10, speech feature vectors 15 are connected with affine transformation module 902 and are applied by classifier input line 901 to classifier 904, during testing. During training, speech feature vectors 15 are connected with affine transformation module 902 and are applied by classifier input line 903 to classifier 904. Preferably, classifier 804 is a vector quantizer classifier. Classifier 804 can correspond, for example, to classifiers 70, 71, 72, shown in FIG. 2, or NTN classifiers 104, 106, 108, 110 and DTW classifiers 120, 122, 124 and 126, shown in FIG. 4.

In speaker verification system 10, the speakers who claim their true identity can be called true speakers, while speakers 11 who claim a fake identity can be called impostors. In evaluating speakers, speaker verification system 10 can make two types of errors: (a) false rejection (FR) and a false acceptance (FA). A false rejection (FR) error occurs when a true speaker claiming a true identity gets rejected by the speaker verification system 10. When an imposter gets accepted by the speaker verification system 10, a false acceptance (FA) error has occurred. The decision to accept or reject an identity depends on a threshold, T, as described above. Depending on the costs of each type of error, the system can be designed to trade-off one error at the cost of the other. Alternatively, in order to evaluate competing technologies, the Equal Error Rate (EER) of systems can be compared. An equal error rate is achieved when both the types of errors (namely, FR and FA) occur with equal probability.

The subword based speaker verification system of the present invention was evaluated on a conventional speech corpus called YOHO, available through Linguistic Data Consortium (LDC), Philadelphia. The subword based speaker verification system 10 of the present invention yielded an equal error rate (EER) of 0.36%, as compared to the conventional Hidden Markov model (HMM)-based system's EER of 1.66% under similar conditions.

The present invention has the advantage of combining a plurality of attributes from different classifiers for providing a powerful recognition system which can accurately recognize a given pattern. In a speaker verification embodiment, a distortion based classifier can be combined with a discriminant based classifier to combine attributes related to the speaker and the speaker and other speakers. Preferably, a neural tree network is used for classifying data from speakers and other speakers with reduced processing. A word recognition enable module can add greater accuracy to the verification system and reduce processing for rejected speakers. Further, the classifiers can be subword based with text dependent or independent data. In addition, the verification system can be trained with a leave one out method for reducing the data needed for training the system. Pole filtering can be used to alleviate channel distortion in the system. An affine transformation of extracted features provides improved correlation between training and testing data. The system can also update the speaker models after a positive verification is made, in order to account for aging phenomenon.

While the invention has been described with reference to the preferred embodiment, this description is not intended to be limiting. It will be appreciated by those of ordinary skill in the art that modifications may be made without departing from the spirit and scope of the invention.

We claim:

1. A method for speaker verification of a speaker comprising the steps of:

extracting at least one feature from first speech spoken by said speaker;

classifying said at least one feature with a plurality of classifiers for forming a plurality of classified output;

fusing said plurality of classified output for forming fused classifier outputs;

recognizing said fused classifier outputs by determining the similarity of said fused classifier outputs and second speech spoken by said speaker before said speaker verification; and determining from said recognized fused classifier outputs whether to accept or reject said speaker.

2. The method of claim 1 further comprising the step of:

determining a confidence from said recognized fused classifier outputs.

3. The method of claim 2 wherein before the step of classifying said at least one feature, said method further comprises the steps of:

performing word recognition on said first speech spoken by said speaker by comparing said at least one feature against data for said speaker stored before said speaker verification for determining whether to preliminarily accept or preliminarily reject said speaker; and enabling said step of classifying said at least one feature if it is determined to preliminarily accept said speaker or enabling a call back module if it is determined to preliminarily reject said speaker.

4. The method of claim 3 wherein said first speech comprises at least one utterance of a password for said speaker.

5. The method of claim 4 wherein said data comprises a speaker dependent template formed from first speech spoken by said speaker in advance and a speaker independent template formed of first speech spoken by at least one second speaker in advance.

6. The method of claim 1 wherein said classifying step is performed with a Neural Tree Network (NTN) classifier and a dynamic time warping classifier.

7. The method of claim 1 wherein said classifying step is performed with a modified neural tree network (MNTN) and a dynamic time warping classifier.

8. The method of claim 7 further comprising the steps of:

extracting at least one feature from second speech spoken by other speakers;

assigning a first label to said at least one feature from first speech spoken by said speaker;

assigning a second label to said at least one feature from said second speech spoken by other speakers; and training said classifiers on said first and second labels.

9. The method of claim 1 wherein said recognizing step comprises:

applying to a pair of said plurality of classifiers, a plurality of first utterances of speech for said speaker and leaving out one of said utterances defined as a left out utterances for training said classifiers;

applying said left out utterances to said pair of classifiers for independently testing said classifiers;

calculating a first probability for a first one of said classifiers in said pair of classifiers and a second probability for a second one of said classifiers in said pair of classifiers; and determining a first threshold for said first one of said classifiers in said pair of classifiers from said first probability and a second threshold for said second one of said classifiers in said pair of classifiers from said second probability, wherein said similarity of said plurality of classified output is determined by comparing said first one of said classifiers in said pair with said first threshold and said second one of said classifiers in said pair with said second threshold.

10. The method of claim 1 wherein said extracting step is performed by modifying poles in a pole filter of said first and second speech to extract said at least one feature.

11. The method of claim 10 wherein said poles are modified by the steps of:

determining a spectral component of said at least one feature; and constraining the narrow bandwidth to obtain a channel estimate.

12. The method of claim 11 further comprising the steps of:

deconvulating said first speech and said second speech with said channel estimate to obtain normalized speech; and computing spectral features of said normalized speech to obtain normalized speech feature vectors which are applied to said classifying step.

13. The method of claim 11 further comprising the steps of:

converting said channel estimate to cepstral coefficients to obtain a modified channel estimate in a cepstral domain; and subtracting said modified channel estimate from cepstral frames of said first speech speech and said second speech.

14. The method of claim 1 further comprising the step of:

segmenting said at least one feature from said first speech into a plurality of first subwords after said extracting step.

15. The method of claim 14 wherein said subwords are phonemes.

16. The method of claim 14 further comprising the steps of:

extracting at least one feature from second speech spoken by other speakers;

segmenting said at least one feature from said second speech into a plurality of second subwords after said extracting step;

storing said first plurality of subwords and said second plurality of subwords in a subword database;

determining from said stored first subwords first labels for said speaker and from said second subwords second labels for other speakers; and training said classifiers on said first and second labels.

17. The method of claim 1 wherein said at least one feature is corrected using an affine map transformation, wherein said affine transformation is represented by $$y=Ax+b$$

wherein y is said affine transform of vector x, A is a matrix representing a linear transformation and vector b represents the translation.

18. The method of claim 17 wherein said at least one feature are cepstral coefficients and said cepstral coefficients are corrected using an affine map transformation.

19. A system for speaker verification of a speaker comprising:

means for extracting at least one feature from first speech spoken by said speaker;

means for classifying said at least one feature with a plurality of classifiers for forming a plurality of classified output;

means for fusing said plurality of classified output for forming fused classifier outputs;

means for recognizing said fused classifier outputs by determining the similarity of said fused classifier outputs and second speech spoken by said speaker before said speaker verification; and means for determining from said recognized fused classifier outputs whether to accept or reject said speaker.

20. The system of claim 19 further comprising:

means for performing word recognition on said first speech spoken by said speaker by comparing said at least one feature against data for said speaker stored before said speaker verification for determining whether to preliminarily accept or preliminarily reject said speaker; and means for enabling said means for classifying said at least one feature if it is determined to preliminarily accept said speaker or enabling a call back module if it is determined to preliminarily reject said speaker.

21. The system of claim 20 wherein said data comprises a speaker dependent template formed from first speech spoken by said speaker in advance and a speaker independent template formed of first speech spoken by at least one second speaker in advance.

22. The system of claim 21 wherein said means for classifying comprises a modified neural tree network (MNTN) and a dynamic time warping classifier.

23. The system of claim 22 wherein said means for extracting is performed by constraining poles in an all pole filter.

24. The system of claim 23 wherein said at least one feature is a cepstral coefficient and said cepstral coefficient is corrected using an affine transformation.

* * * * *